United States Patent
Rajagopal (10) Patent No.: US 9,285,861 B2
(45) Date of Patent: Mar. 15, 2016

(54) POWER SAVING IN COMPUTING DEVICES

(71) Applicant: General Instrument Corporation, Horsham, PA (US)

(72) Inventor: Selvamani Rajagopal, San Jose, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 360 days.

(21) Appl. No.: 13/691,094

(22) Filed: Nov. 30, 2012

(65) Prior Publication Data

US 2014/0157016 A1 Jun. 5, 2014

(51) Int. Cl.
*G06F 1/26* (2006.01)
*G06F 1/32* (2006.01)

(52) U.S. Cl.
CPC ............ *G06F 1/3234* (2013.01); *G06F 1/3278* (2013.01); *G06F 1/3203* (2013.01); *Y02B 60/126* (2013.01)

(58) Field of Classification Search
CPC .................................................... G06F 1/3234
USPC ......................................................... 713/320
See application file for complete search history.

(56) References Cited

U.S. PATENT DOCUMENTS

| | | | | |
|---|---|---|---|---|
| 6,853,695 | B1 * | 2/2005 | Betts et al. | 375/371 |
| 7,720,167 | B2 * | 5/2010 | Stopler | 375/264 |
| 8,094,746 | B2 * | 1/2012 | Shi | 375/295 |
| 2002/0159584 | A1 * | 10/2002 | Sindalovsky et al. | 379/386 |
| 2005/0213405 | A1 * | 9/2005 | Stopler | 365/203 |
| 2008/0018427 | A1 * | 1/2008 | Ezra et al. | 340/7.32 |
| 2008/0181393 | A1 * | 7/2008 | Brost et al. | 379/413 |
| 2009/0141823 | A1 * | 6/2009 | Long | 375/260 |
| 2009/0180526 | A1 * | 7/2009 | Long | 375/222 |
| 2010/0067422 | A1 * | 3/2010 | Kadous et al. | 370/311 |
| 2010/0180139 | A1 * | 7/2010 | Denney et al. | 713/330 |
| 2011/0228867 | A1 * | 9/2011 | Angell et al. | 375/259 |
| 2012/0033676 | A1 * | 2/2012 | Mundra et al. | 370/401 |
| 2013/0034133 | A1 * | 2/2013 | Gupta | 375/219 |

OTHER PUBLICATIONS

"Assymetric Digital Subscriber Line Transceivers 2 (ADSL2), Series G: Transmission Systems and Media, Digital Systems and Networks—Digital Sections and Digital Line Systems—Access Networks", Telecommunication Standardization Sector of ITU, G.992.3, Apr. 2009.

* cited by examiner

*Primary Examiner* — Thomas Lee
*Assistant Examiner* — Volvick Derose
(74) *Attorney, Agent, or Firm* — Lori Anne D. Swanson (57) ABSTRACT

Power saving in computing devices is provided. A first computing device communicates with a second computing device using a first set of tones. A low power event is detected by the first computing device. In response to the detected low power event, a request to communicate using a second set of tones is sent to the second computing device by the first computing device. The second set of tones has fewer tones than the first set of tones, and may be a subset of the first set of tones.

20 Claims, 5 Drawing Sheets

POWER SAVING IN COMPUTING DEVICES

FIELD

The disclosure is directed to power saving in computing devices such as Digital Subscriber Line ("DSL") modems and routers.

BACKGROUND

Broadband services, such as DSL, are increasingly becoming an essential part of many households. For example, many households rely on broadband services to provide Internet connectivity, telephone service (e.g., VoIP), and television service (e.g., IPTV). As the reliance on broadband services has increased, so has the need to improve the reliability of such services.

One such improvement is the inclusion of batteries in broadband equipment such as DSL modems and DSL routers. By including batteries, the broadband equipment may continue to provide services to a household even in the event of a full or partial power outage. However, the amount of power that can be supplied by a battery is finite, leading to a need for improved power management for broadband equipment.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

In a DSL device, such as a DSL modem or a DSL router, the save-our-showtime ("SOS") functionality is used to reduce the amount of power that the DSL device uses when on battery power. For example, SOS allows a DSL device to reduce the number of tones that are used to communicate with a digital subscriber line access multiplexer ("DSLAM") in the presence of noise or other interference on the link between the DSL device and the DSLAM. Disclosed herein are implementations of SOS functionality that reduce the number of tones used to communicate when the DSL device is on battery power, even where there is no noise or interference. Because communicating using the reduced set of tones uses less power than the full set of tones, the amount of time that the DSL device can operate on battery power is increased. By leveraging off SOS functionality, the power saving capabilities disclosed herein can be realized in new, existing, and legacy DSL devices.

In very-high-bit-rate digital subscriber line (VDSL) standards, the feature for reducing the amount of power that the DSL device uses is known as SOS. Disclosed are manners for triggering the SOS so that the DSL connection uses less tones, thereby reducing power consumption, and concepts for implementing features to support SOS in the DSLAM. As described below, the CPE device may have a priori knowledge regarding whether the DSLAM on the other end of the DSL connection supports the SOS functionality, such as through a handshake protocol. The handshake protocol may be standardized by the ITU (International Telecommunication Union), for example.

In an implementation, a first computing device communicates using a first set of tones with a second computing device. A low power event is detected by the first computing device. In response to the detected low power event, a request to communicate using a second set of tones is sent to the second computing device by the first computing device. The second set of tones may be a subset of the first set of tones.

In an implementation, a first computing device communicates with a second computing device using a first set of tones. An indication of a low power event is received from the first computing device by the second computing device. In response to the indication of the low power event, an instruction to communicate using a second set of tones is sent to the first computing device by the second computing device. The second set of tones has fewer tones than the first set of tones. The first computing device communicates with the second computing device using the second set of tones.

Figure 1:
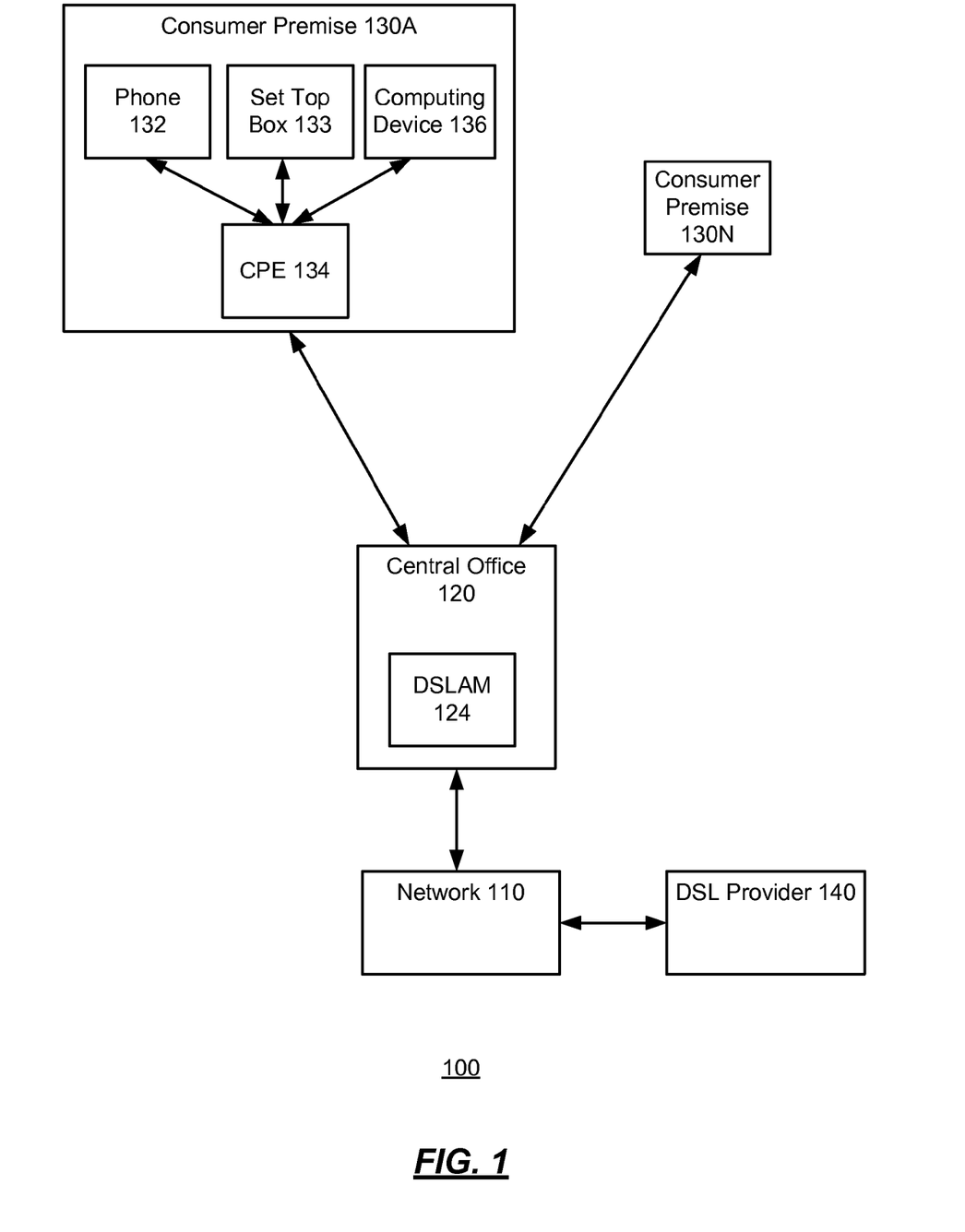
FIG. 1 is a diagram of an exemplary environment in which aspects described herein may be implemented.

FIG. 1 is a diagram of an exemplary environment 100 in which aspects disclosed herein may be implemented. As illustrated, the environment 100 may include a network 110. A central office 120 may connect to the network 110 and to a plurality of consumer premises 130A through 130N (referred to collectively as the consumer premises 130). A DSL provider 140 may also connect to the network 110. The network 110 may include a Local Area Network ("LAN"), a wide area network ("WAN"), such as a cellular network, a satellite network, a broadcast television based network, the Internet, a private WAN, or a combination of the Internet and a private WAN, that is used to transport data. The network 110 may include a number of separate networks that function to provide services to the consumer premises 130.

In some implementations, the network 110 may be a network that provides voice and data services for the consumer premises 130. The network 110 may include a high capacity data backbone associated with the DSL provider 140. For instance, the network 110 may include a circuit-switched telephone network and a packet-based data network.

The consumer premises 130 may be connected, through the central office 120, to the network 110. The central office 120 may represent a physical location, generally controlled by the DSL provider 140, through which the consumer premises 130 connect to the network 110.

In some implementations, the central office 120 may particularly include a DSLAM 124. The DSLAM 124 may connect multiple consumer premises 130 to the network 110. In general, the DSLAM 124 may collect data from a plurality of modem ports and aggregate the voice and data traffic into one complex composite signal via multiplexing. Depending on its device architecture and setup, the DSLAM 124 may aggregate DSL lines over Asynchronous Transfer Mode, frame relay, and/or an Internet Protocol network. The aggregated traffic may then be directed to the network 110, for example.

Figure 5:
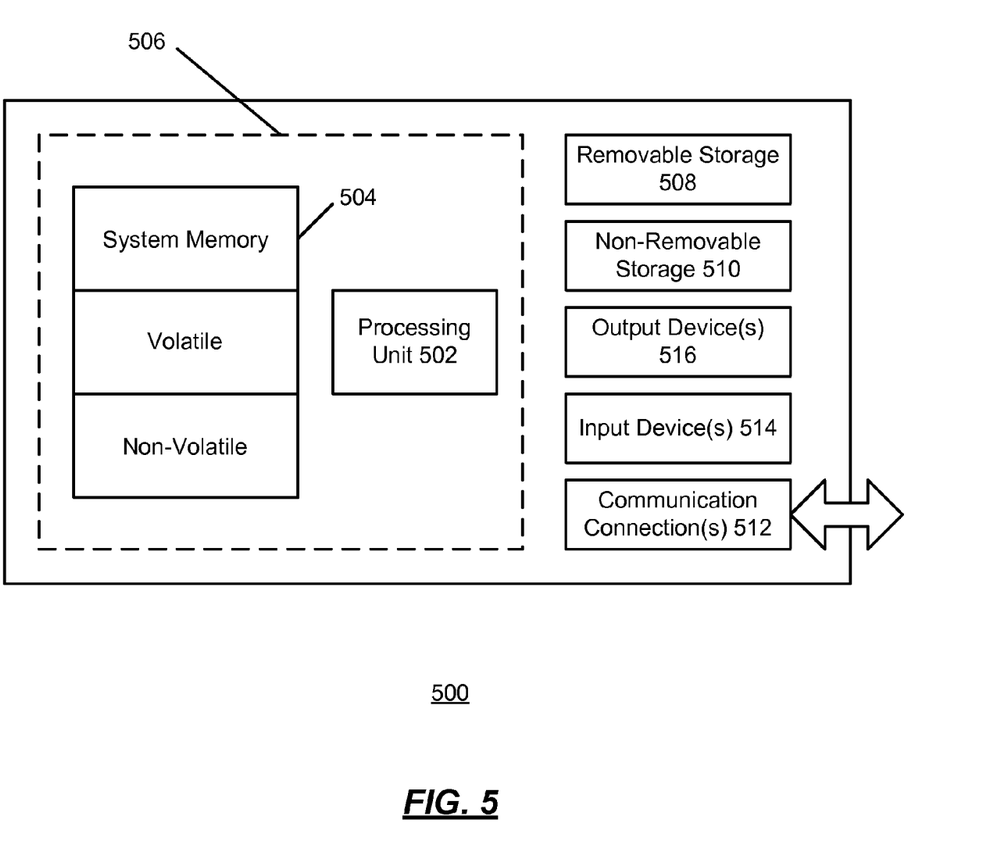
FIG. 5 shows an exemplary computing environment in which example embodiments and aspects may be implemented.

The DSLAM 124 may be implemented using one or more general purpose computing devices, such as the computing system 500 described with respect to FIG. 5.

The consumer premises 130 may each represent a subscriber to the DSL service offered by the DSL provider 140. Each consumer premise 130 may connect to the central office 120 through a link such as conventional twisted pair cabling. Other types of links may be may be used. Each consumer premise 130, may include, for example, one or more phones 132, set top boxes 133, and computing devices 136, each connected to a consumer premises equipment ("CPE") 134 to receive one or more DSL services such a data and/or voice service. Other types of devices and services may be supported.

The CPE 134 may be implemented by a DSL modem, a DSL router, or a general purpose computing device, such as the computing system 500. The CPE 134 may include circuitry to modulate high frequency tones for the transmission of data to the DSLAM 124. The CPE 134 may correspondingly receive and demodulate signals from the DSLAM 124 using the same high frequency tones. The CPE 134 and the DSLAM 124 may communicate via the link between the consumer premises 130 and the central office 120. The CPE 134 may provide a data connection to one or more connected devices (e.g., the phone 132, the set top box 133, and the computing device 136) via, for example, an Ethernet or Universal Serial Bus connection. In some implementations, the CPE 134 may also include an integrated router or switch. In these situations, the CPE 134, in addition to converting between DSL frequency signals and Ethernet signals, may provide local routing services to connected devices.

Figure 2:
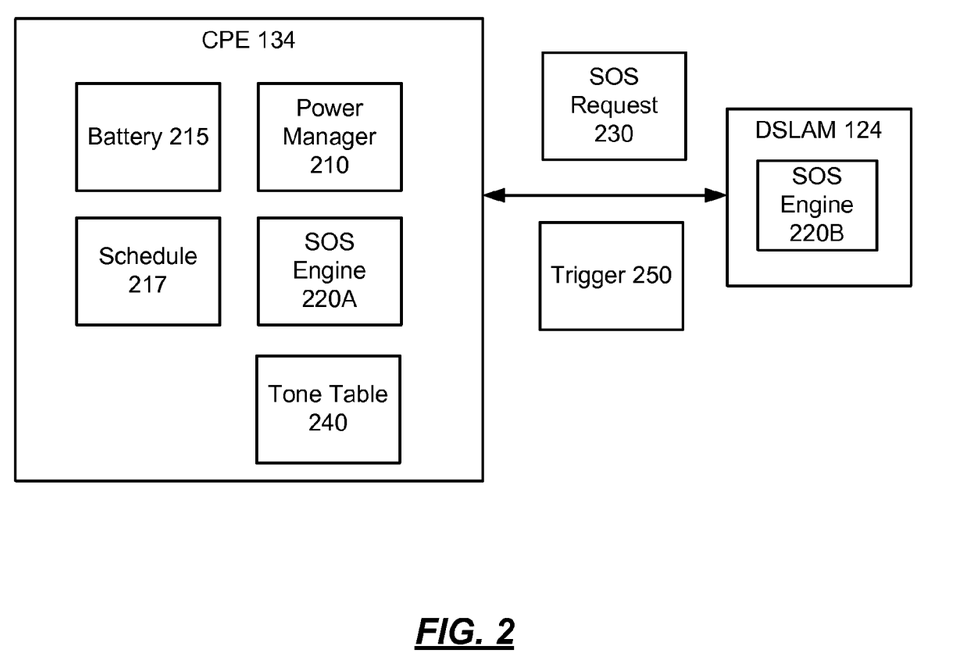
FIG. 2 is an illustration of an example consumer premises equipment ("CPE") and digital subscriber line access multiplexer ("DSLAM")

FIG. 2 is an illustration of an example CPE 134 and DSLAM 124. The CPE 134 may include one or more components including a battery 215, a power manager 210, a schedule 217, an SOS engine 220A, and a tone table 240. The DSLAM 124 may include one or more components including an SOS engine 220B. More or fewer components may be supported.

As described previously, reliable broadband services are desirable; accordingly, the CPE 134 may include the battery 215. The battery 215 may provide power to the CPE 134 in the event that the general purpose electrical service to the consumer premise 130 becomes unavailable. The battery 215 may include a variety of battery types including rechargeable and non-rechargeable battery types. The battery 215 may be internal to the CPE 134 or may be an external battery. A battery powered CPE is typically a requirement for VOIP supported CPEs.

Because the power available to the battery 215 is limited, the CPE 134 may further include the power manager 210. The power manager 210 may lower the overall power used by the CPE 134, and therefore increase the amount of time that the CPE 134 can operate using power from the battery 215. Moreover, in some implementations, the power manager 210 may lower the power used by the CPE 134 even when the CPE 134 is using the general purpose power service of the consumer premise 130 (i.e., not using the battery 215). Where there are hundreds of thousands of CPEs 134 in operation, even a small power reduction by each CPE 134 may result in a large overall power savings. Thus, the disclosed techniques may address saving power when operating in battery mode, but also may address saving power when CPE traffic through the CEP is less, such as when the user is not using the Internet connection or during dormant times, such as at night.

The power manager 210 may detect what is referred to herein as a low power event, and may lower the power used by the CPE 134 upon detection of the low power event. One example of a low power event is the CPE 134 switching to power from the battery 215. When the general purpose power service of the consumer premise 130 fails, or partially fails, the CPE 134 may automatically begin receiving power from the battery 215. In addition, an interrupt, or other signal, may be sent to the power manager 210 to indicate the switch to the battery 215. The power manager 210 may interpret the signal as a low power event.

Other examples of low power events are data-based low power events and schedule-based low power events. Data-based low power events are based on the presence or absence of data being communicated between the CPE 134 and the DLSAM 124. If no data is communicated between the CPE 134 and the DSLAM 124 for more than a threshold amount of time, then the CPE 134 may send an interrupt, or other signal, to the power manager 210. The power manager 210 may interpret the signal as a low power event.

For schedule-based low power events, the power manager 210 may use the schedule 217 to determine low power events. The schedule 217 may include time periods when the power manager 210 may reduce the power used by the CPE 134. The schedule 217 may be received from the DSLAM 124 and may have been generated by a user or administrator based on typical customer behavior (i.e., when customers typically use data or voice services provided by the CPE 134). Alternatively, the schedule 217 may be generated by the power manager 210 based on observed actual usage of the CPE 134 by a customer.

In some implementations, the power manager 210 may use a combination of all or some of the battery 215, the schedule 217, and the data-based low power events to manage power consumption. For example, the power manager 210 may determine to reduce the power of the CPE 134 when there is no data communicated between the CPE 134 and the DSLAM 124, and the schedule 217 indicates that the CPE 134 is unlikely to be used by a customer. However, the power manager 201 may determine not to reduce the power of the CPE 134 when there is data communicated between the CPE 134 and the DSLAM 124, and the schedule 217 indicates that the CPE 134 is unlikely to be used by a customer.

The power manager 210 may use the save-our-showtime ("SOS") engine 220A to provide increased communication reliability with respect to the link between the CPE 134 and the DSLAM 124. SOS is a feature that may be incorporated into many CPEs 134 and DSLAMs 124. The SOS engine 220A allows the CPE 134 and the DSLAM 124 to adapt to increases in noise (or degradations in a signal-to-noise ratio) in the link between the CPE 134 and the DSLAM 124. The SOS engine 220A allows the CPE 134 and the DSLAM 124 to maintain a minimum or reduced connection in the presence of noise, and therefore avoid a costly retrain of the CPE 134. Thus, the SOS feature may be used in noisy line environments for improving the signal-to-noise ration between the DSLAM and the CPE, but the SOS feature may be used as disclosed when the CPE needs to conserve power, such as when the CPE is operating from battery. The existing algorithm between the DSLAM and CPE may be changed to accommodate the add-on SOS features. The SOS feature may be enabled when in power save mode, for example.

During normal operation, the CPE 134 and the DSLAM 124 may communicate via the link between the CPE 134 and the DSLAM 124 by modulating and demodulating data onto a predetermined set of tones. When the SOS engine 220A detects noise or degradation of the signal-to-noise ratio on the link, the SOS engine 220A may determine a reduced set of tones that may be used to communicate between the CPE 134 and the DSLAM 124 that avoids the detected noise. The reduced set of tones may be determined using the tone table 240 or may be determined using a formula. The tone table 240 may be stored at the CPE 134 and may have been provided by the DSLAM 124. The reduced set of tones may be a subset of the predetermined set of tones.

The SOS engine 220A may then send an SOS request 230 to the SOS engine 220B of the DSLAM 124 via the link between the CPE 134 and the DSLAM 124. The SOS request 230 may identify the determined reduced set of tones (e.g., the subset of tones). The SOS engine 220B of the DSLAM 124 may respond to the SOS request 230 by sending the CPE 134 a trigger 250 via the link that instructs the CPE 134 to begin communicating using the determined reduced set of tones. The trigger 250 may be a synchronization signal. Alternatively or additionally, the SOS engine 220B of the DSLAM 124 may determine the reduced set of tones to use for communication, and the trigger 250 may include an indicator of the determined reduced set of tones (e.g., a reference to the tone table 240).

After receiving the trigger 250, the CPE 134 may begin communicating with the DSLAM 124 using the reduced set of tones. At a later time, when the SOS engine 220A detects the that the noise is gone or that the signal-to-noise ratio is normal, the SOS engine 220A may send an SOS request 230 to the SOS engine 220B of the DLSAM 124 that the normal or original set of tones be used to communicate.

In some implementations, the tone table 240 may identify sets of tones that that may be used to communicate between the DSLAM 124 and the CPE 134 under a variety of operating conditions. The tones may be indexed based on the particular frequencies of noise or crosstalk that are observed on the link by the SOS engine 220A. The reduced set tones may be selected by the SOS engine 220A from the tone table 240 based on the observed noise such that tones having frequencies that overlap with or include frequencies of the observed noise are not used to communicate between the CPE 134 and the DSLAM 124.

The SOS engine 220A may also be used by the CPE 134 to reduce the power used by the CPE 134. When communicating using the reduced set of tones, the CPE 134 uses less power than when communicating using the full or normal set of tones. Thus, even in the absence of noise or a low signal-to-noise ratio, the power manager 210 may reduce the power used by the CPE 134 by instructing the SOS engine 220A to communicate with the DSLAM 124 using a reduced set of tones.

In some implementations, the power manager 210 may detect a low power event (such as the CPE 134 running on power from the battery 215), and may instruct the SOS engine 220A to use a reduced set of tones. For example, the power manager 210 may use an application programming interface associated with the SOS engine 220A to generate the instructions. The SOS engine 220A may then receive the request, and may generate and send an SOS request 230 to the SOS engine 220B of the DSLAM 124 requesting communication using the reduced set of tones.

In some implementations, the SOS engine 220A may select the tones used for the reduced set of tones. The SOS engine 220A may select the reduced set of tones using the tone table 240, or using a formula. The SOS engine 220A may select the reduced set of tones that maximizes the amount of power that is saved by the CPE 134. For example, the SOS engine 220A may select the set of tones with the fewest tones that is supported for communication between the CPE 134 and the DSLAM 124.

In implementations where the SOS engine 220B of the DSLAM 124 selects the reduced set of tones, the SOS engine 220A, as instructed by the power manager 210, may send an SOS request 230 to the SOS engine 220B of the DSLAM 124. The request 230 may specify that there is a low power event. Alternatively, the request 230 may specify that there is noise on the link between the CPE 134 and the DSLAM 124, even where no such noise exists. Such fictional noise may allow the CPE 134 to use a reduced set of tones to save power with a DSLAM 124 that does not support using reduced sets of tones for power savings. The SOS engine 220B of the DSLAM 124 may respond with a trigger 250 that specifies the reduced set of tones, or includes a reference to the reduced set of tones in the tone table 240.

The power manager 210 may determine that the low power event has ended and may determine to return to the original set of tones for communicating with the DSLAM 124 over the link. Communicating with the DSLAM 124 using the reduced set of tones may reduce the performance and available bandwidth of the link between the CPE 134 and DSLAM 124, and therefore may be generally undesirable. The power manager 210 may determine that the low power event has ended when the CPE 134 is no longer using the battery 215 for power, as indicated by the schedule 217, or upon data being communicated through the CPE 134 by an attached device.

In response to determining to return to the original set of tones, the power manager 210 may instruct the SOS engine 220A to return to the original set of tones. The SOS engine 220A may then generate and send an SOS request 230 to the SOS engine 220B of the DSLAM 124. The SOS engine 220B of the DLSAM 124 may respond with a trigger 250. After receiving the trigger 250, the CPE 134 may begin communicating with the DSLAM 124 using the original set of tones.

In implementations where the SOS engine 220B of the DLSAM 124 selects the tones, the SOS engine 220A may send an SOS request 230 that indicates that the low power event has ended, or alternatively, that the fictional noise on the link between the CPE 134 and the DSLAM 124 is gone. The SOS engine 220B of the DSLAM 124 may then respond with a trigger 250 that instructs the CPE 134 to begin communicating using the original set of tones.

Figure 3:
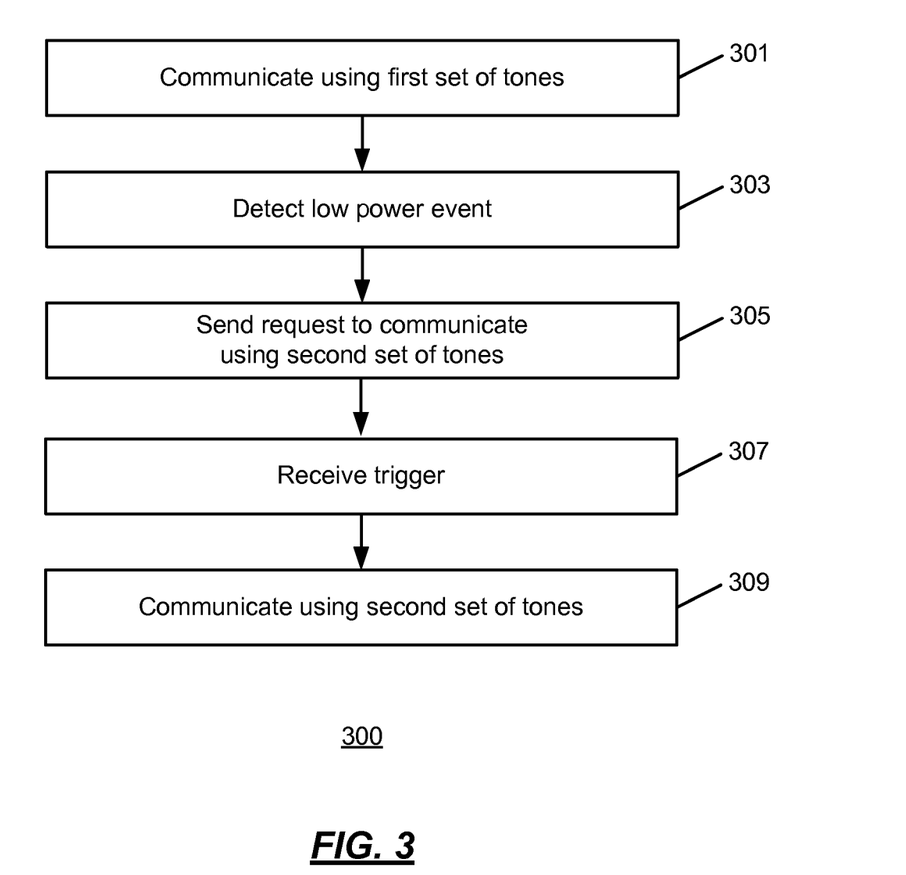
FIG. 3 is an operational flow of an implementation of a method for using a reduced set of tones to save power in a CPE.

FIG. 3 is an operational flow of an implementation of a method 300 for using a reduced set of tones to save power in a CPE. The method 300 may be implemented by the CPE 134, for example.

A first set of tones is used to communicate at 301. The first set of tones is used by a CPE 134 to communicate with a DSLAM 124. The first set of tones may be a set of tones that is normally used for communication between the CPE 134 and the DSLAM 124 under optimal link conditions (i.e., low or no noise).

A low power event is detected at 303. The low power event is detected by the power manager 210. The low power event may be the CPE 134 switching to the battery 215 as a power source. Alternatively or additionally, the low power event may be the CPE 134 detecting no data activity, or a scheduled event. For example, the CPE 134 may determine that no connected devices (e.g., the phone 132, the set top box 133, the computing device 136, etc.) are sending or receiving data through the CPE 134. The scheduled event may be based on the schedule 217 and may be based on the data usage habits of one or more consumers.

A request to communicate using a second set of tones is sent at 305. The request may be sent by the SOS engine 220A to the SOS engine 220B of the DSLAM 124 in response to the power manager 210 detecting the low power event over a link between the CPE 134 and the DSLAM 124. The second set of tones may have fewer tones than the first set of tones, and communicating using the second set of tones may use less power than communicating using the first set of tones. The request may be an SOS request 230. The SOS request 230 may be sent to the SOS engine 220B of the DSLAM 124 even though there is no noise on the link between the CPE 134 and the DSLAM 124 and a signal-to-noise ratio associated with the link remains normal or acceptable. In some implementations, the CPE 134 may determine the second set of tones, and the determined second set of tones may be identified in the request 230. In other implementations, the SOS request 230 may request that the SOS engine 220B of the DSLAM 124 select the second set of tones. The SOS request 230 may comprise an instruction and may be sent using an IP packet or other communication protocol.

A trigger is received at 307. The trigger 250 may be received by the CPE 134 from the SOS engine 220B of the DSLAM 124 via the link between the CPE 134 and the DSLAM 124. The trigger 250 may include identifiers of the second set of tones. For example, the trigger 250 may include a reference to the tone table 240. The tone table 240 may include a variety of predetermined tone combinations that may be used by the CPE 134 and the DSLAM 124 to communicate. The trigger 250 may comprise a synchronization signal and may synchronize the tones used to communicate between the CPE 134 and the DSLAM 124.

The second set of tones is used to communicate at 309. The CPE 134 may communicate with the DSLAM 124 using the second set of tones resulting in less overall power consumption than when communicating using the first set of tones. The CPE 134 may communicate with the DSLAM 124 using the second set of tones until the power manager 210 determines that the low power event has ended. For example, the power manager 210 may determine that the low power event has ended when the CPE 134 stops receiving power from the battery 215.

Figure 4:
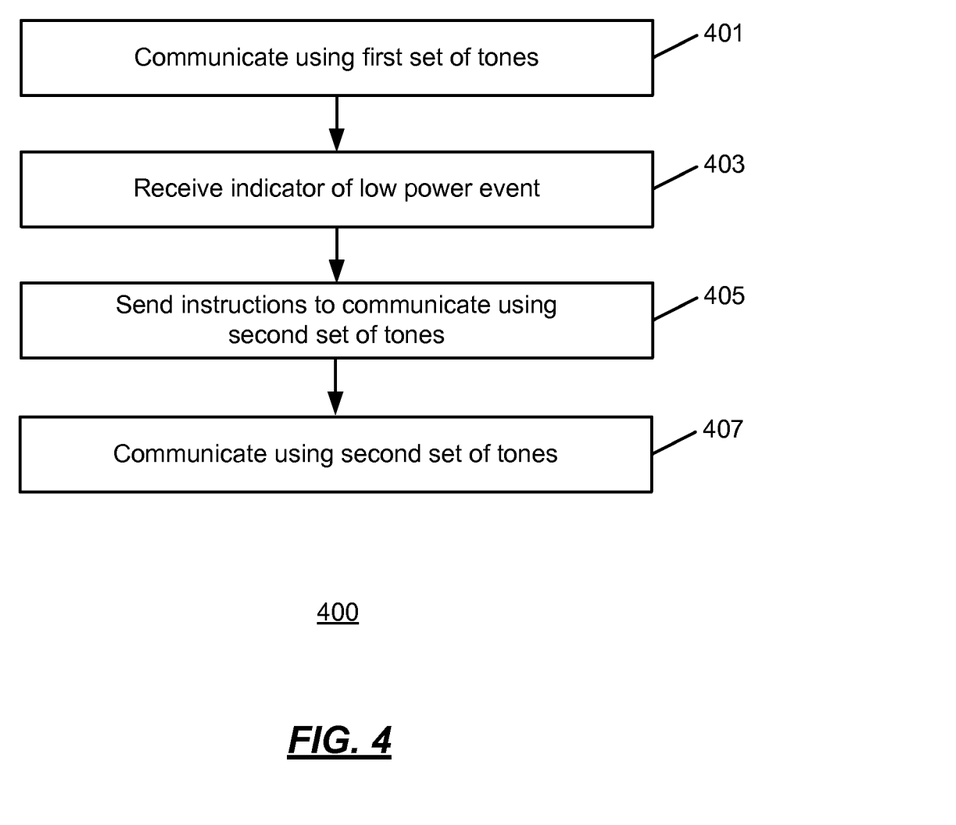
FIG. 4 is an operational flow of an implementation of another method for using a reduced set of tones to save power in a CPE.

FIG. 4 is an operational flow of an implementation of a method 400 for using a reduced set of tones to save power in a CPE. The method 400 may be implemented by the DSLAM 124, for example.

A first set of tones is used to communicate at 401. The first set of tones is used by the DSLAM 124 to communicate with the CPE 134. The first set of tones may be a set of tones that is normally used for communication between the DSLAM 124 and the CPE 134.

An indicator of a low power event is received at 403. The indicator may be the SOS request 230 and may be received by the SOS engine 220B of the DSLAM 124 from the CPE 134. The indicator may have been generated and sent to the DSLAM 124 in response to the power manager 210 of the CPE 134 detecting the low power event. The low power event may be the CPE 134 switching to the battery 215 as a power source, for example.

In some implementations, the indicator of the low power event may include an indicator of a second set of tones. Alternatively, the indicator of a low power event may (falsely) indicate that a link between the CPE 134 and the DSLAM 124 has noise because the DSLAM 124 may not support communicating using reduced sets of tones for purposes of power saving.

Instructions to communicate using the second set of tones are sent at 405. The instructions may be the trigger 250 and may be sent to the CPE 134 by the SOS engine 220B of the DSLAM 124. The instructions may include the second set of tones, or may include an identifier of the second set of tones. The identifier may be used by the SOS engine 220A of the CPE 134 to determine the second set of tones using the tone table 240, for example.

The second set of tones is used to communicate at 407. The DSLAM 124 may begin communicating with the CPE 134 using the second set of tones in response to receiving the instructions, resulting in less overall power consumption than when communicating using the first set of tones.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communication connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

While the principles of the techniques disclosed herein have been described above in connection with specific methods, systems, and apparatuses, it is to be clearly understood that this description is made only by way of example and not as a limitation on scope.

I claim:

1. A method comprising:
   communicating between a first computing device and a second computing device using a first set of tones;
   detecting a low power event at the first computing device;
   in response to the detected low power event, sending a save-our-showtime (SOS) request to an SOS engine requesting to modify the communication between the first computing device and the second computing device based on the low power event;
   determining whether the second computing device supports managing power consumption via SOS functionality;
   identifying a reduced number of tones for communication between the first computing device and the second computing device,
   wherein the SOS request causes modification to the communication between the second computing device and the first computing device using a second set of tones, wherein the second set of tones has fewer tones than the first set of tones, the SOS request including an indicator at least one of:
      an SOS event that corresponds to the identified reduced number of tones,
      a reduced number of tones identified by the first computing device, or
      the low power event with an indication for the second computing device to identify the reduced the number of tones for modifying the communication between the first computing device and the second computing device.

2. The method of claim 1, further comprising:
   receiving a trigger by the first computing device from the second computing device in response to the request, wherein the trigger identifies the second set of tones; and
   communicating by the first computing device with the second computing device using the second set of tones.

3. The method of claim 1, wherein the low power event is the first computing device switching to battery power.

4. The method of claim 1, wherein the low power event comprises the first computing device detecting no data activity or a scheduled event.

5. The method of claim 1, wherein communicating using the second set of tones uses less power than communicating using the first set of tones.

6. The method of claim 1, wherein the first computing device comprises a digital subscriber line (DSL) modem or a DSL router.

7. The method of claim 1, wherein the second computing device comprises a digital subscriber line access multiplexer (DSLAM).

8. The method of claim 1, wherein the request comprises a save-our-showtime (SOS) request.

9. A method comprising:
   communicating with a first computing device using a first set of tones by a second computing device, wherein the second computing device supports managing power consumption via SOS functionality;
   in response to detection of a lower power event, receiving, at the second computing device from the first computing device, a save-our-showtime (SOS) request requesting modification to the communication between the first computing device and the second computing device based on the low power event, the SOS request including an indicator at least one of:
      an SOS event that corresponds to a reduced number of tones,
      a reduced number of tones identified by the first computing device, or
      a low power event at the first computing device, including an indication for the second computing device to identify a reduced number of tones for modifying the communication between the first computing device and the second computing device
   in response to the SOS request, determining a second set of tones for communicating between the first computing device and the second computing device, wherein the second set of tones has fewer tones than the first set of tones;
   sending an instruction to the first computing device to communicate using the second set of tones by the second computing device; and
   communicating with the first computing device using the second set of tones by the second computing device.

10. The method of claim 9, wherein the first computing device comprises a digital subscriber line (DSL) modem or a DSL router, and wherein the second computing device comprises a digital subscriber line access multiplexer (DSLAM).

11. The method of claim 9, wherein the second set of tones is a subset of the first set of tones.

12. The method of claim 9, wherein the low power event is the first computing device switching to battery power.

13. The method of claim 9, wherein the low power event comprises the first computing device detecting no data activity or a scheduled event.

14. The method of claim 9, wherein communicating using the second set of tones uses less power than communicating using the first set of tones.

15. The method of claim 9, wherein the received indication of a low power event comprises a save-our-showtime (SOS) request.

16. The method of claim 9, wherein the instruction to the first computing device to communicate using the second set of tones comprises a trigger.

17. The method of claim 9, wherein the instruction to the first computing device to communicate using the second set of tones comprises a reference to a table stored at the first computing device.

18. A system comprising:
- a digital subscriber line (DSL) modem that communicates using a first set of tones with a digital subscriber line access multiplexer (DSLAM) that supports managing power consumption via save-our-showtime (SOS) functionality;
- a power manager that detects a low power event;
- a save-our-showtime (SOS) engine that, in response to the detected low power event, sends an SOS request to cause modification of the communication between the DSL modem and the DSLAM modem using a second set of tones, the SOS request including an indicator of at least one of:
  - an SOS event that corresponds to a reduced number of tones,
  - an indicator of a reduced number of tones identified by the DSL modem, or
  - an indicator of a low power event with an indication for the DSLAM to reduce the number of tones used for communication between the DSL modem and the DSLA,
- the system receiving an instruction from the DSLAM to communicate with the DSLAM using the second set of tones, wherein the second set of tones has fewer tones than the first set of tones, and wherein communicating using the second set of tones uses less power than communicating using the first set of tones.

19. The system of claim 18, wherein the power manger detecting the low power event comprises the power manager detecting no data activity in the DSL modem.

20. The system of claim 18, wherein the system further includes a battery, and the power manger detecting the low power event comprises the power manager detecting that the DSL modem is receiving power from the battery.

\* \* \* \* \*